United States Patent
Miyashita et al.

(10) Patent No.: US 7,646,187 B2
(45) Date of Patent: Jan. 12, 2010

(54) METHOD AND APPARATUS FOR SWITCHING REGULATOR CAPABLE OF QUICK FEEDBACK FROM LOAD

(75) Inventors: Hitoshi Miyashita, Tokyo (JP); Kenji Sugiura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 11/527,937

(22) Filed: Sep. 26, 2006

(65) Prior Publication Data

US 2007/0069707 A1    Mar. 29, 2007

(30) Foreign Application Priority Data

Sep. 28, 2005    (JP)    ............................. 2005-281758

(51) Int. Cl.
*G05F 1/40*    (2006.01)
(52) U.S. Cl. ........................................ 323/284; 363/17
(58) Field of Classification Search ......... 323/282–288, 323/265, 266; 363/17–20, 97–98, 56
See application file for complete search history.

(56) References Cited

U.S. PATENT DOCUMENTS 4,685,040 A * 8/1987 Steigerwald et al. .......... 363/17
6,100,675 A * 8/2000 Sudo .......................... 323/282

FOREIGN PATENT DOCUMENTS

| JP | 3506913 | 12/2003 |
| JP | 2005-160254 | 6/2005 |

* cited by examiner

*Primary Examiner*—Rajnikant B Patel
(74) *Attorney, Agent, or Firm*—Cooper & Dunham, LLP (57) ABSTRACT

This patent specification describes a power adapter which includes a first amplifier configured to amplify a voltage difference between a voltage proportional to an output voltage of a switching regulator and a first reference voltage, a current detector configured to detect a current proportional to an output current of the switching regulator, a second amplifier configured to amplify an output signal from the current detector, a first converter configured to convert an output voltage of the first amplifier to a first current signal, a second converter configured to convert an output voltage of the second amplifier to a second current signal, an oscillator configured to oscillate with rectangular pulses and a controller configured to modulate an oscillation signal of the oscillator in accordance with the first and second current signals output from the first and second converters.

8 Claims, 9 Drawing Sheets

METHOD AND APPARATUS FOR SWITCHING REGULATOR CAPABLE OF QUICK FEEDBACK FROM LOAD

FIELD

The present disclosure relates to a method and apparatus for switching regulation, and more particularly to a method and apparatus for switching regulation capable of quick feedback from load.

BACKGROUND

Recently, energy-saving has been actively promoted in terms of environmental measure. For portable electronic equipment using battery, such as a mobile phone, a digital camera, a PDA (portable digital assistant), a notebook computer, a portable multimedia player (for example, MP3 player, optical disc player, etc.), and so on, it is desirable to have a longer battery life. Such portable equipment commonly employs a switching regulator in power system because a compact and high efficiency power system can be obtained using the switching regulator.

A conventional switching regulator generally includes a feedback circuit to stabilize output voltage. In the feedback circuit, an ON/OFF circuit is controlled by changing an input pulse width applied to the ON/OFF circuit. The conventional switching regulator includes an oscillation circuit and a comparator which outputs a control signal to control the oscillation circuit. The comparator compares an output voltage of an error-AMP (amplifier) with a reference voltage.

For example, if the control signal from the comparator outputs is H (high), the oscillation circuit oscillates with a high frequency. If the control signal from the comparator outputs is L (low), the oscillation circuit oscillates with a low frequency which is lower frequency than the high frequency. The operation of the switching regulator will be described more specifically.

Figure 1:
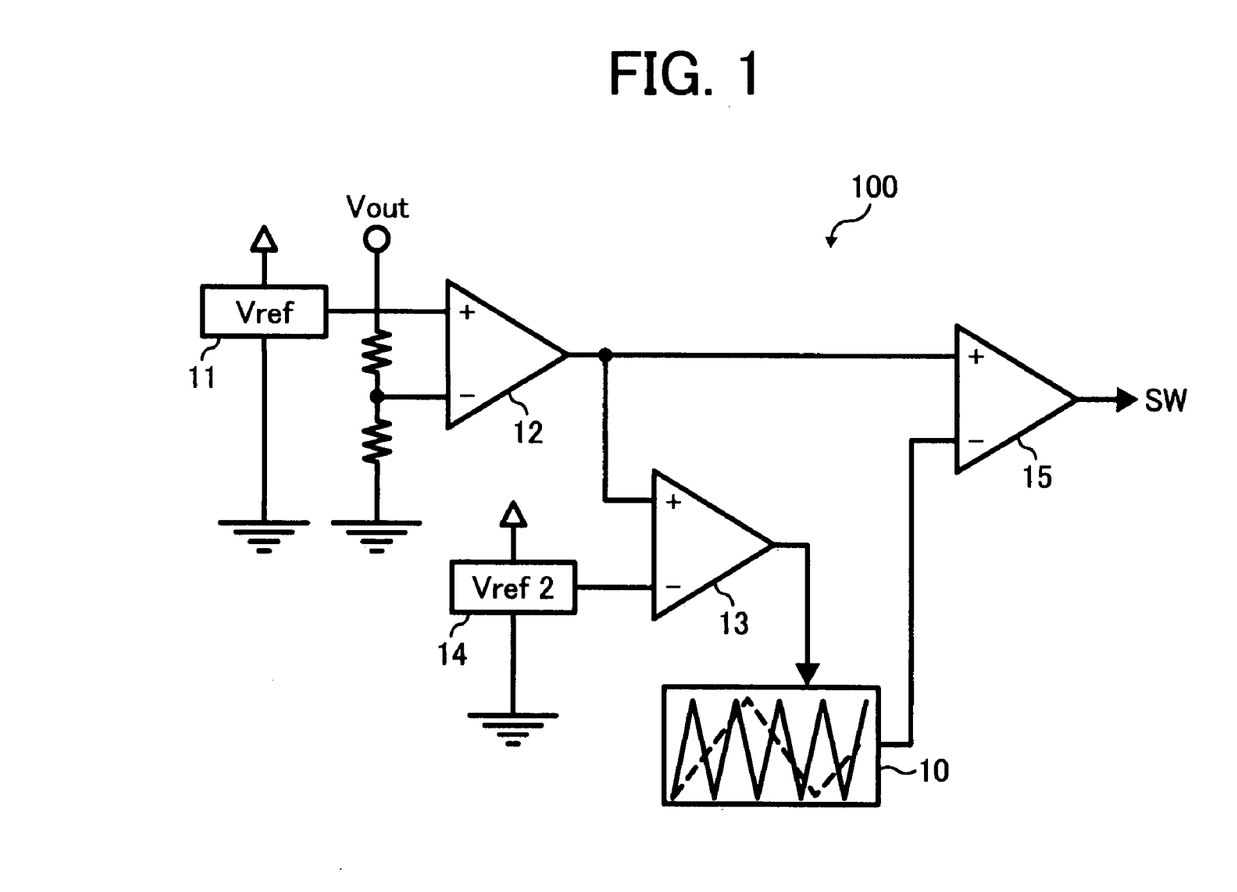
FIG. 1 illustrates a conventional switching regulator.

FIG. 1 illustrates a conventional switching regulator 100. The switching regulator 100 includes a triangular-pulse generator 10, a first and second reference voltage circuits 11 and 14, bleeder resistances, an error-AMP 12, a comparator 13 and a PWM (pulse width modulation) comparator 15.

The error-AMP 12 inputs an output voltage Vout of the switching regulator 100, which is applied to a load as a load voltage, and a reference voltage Vref1 of the first reference voltage circuit 11. The error-AMP 12 outputs a voltage difference between these two voltages. The comparator 13 inputs the voltage difference and a second reference voltage Vref2 of the second reference voltage circuit 14. The comparator 13 judges whether the difference voltage is higher than the reference voltage Vref2 of the second reference voltage circuit 14.

The PWM comparator 15 outputs a control signal by comparing an output signal of the triangular-pulse generator 10 with the output voltage of the error-AMP 12. The output signal of the triangular-pulse generator 10 is a triangular wave.

Figure 2:
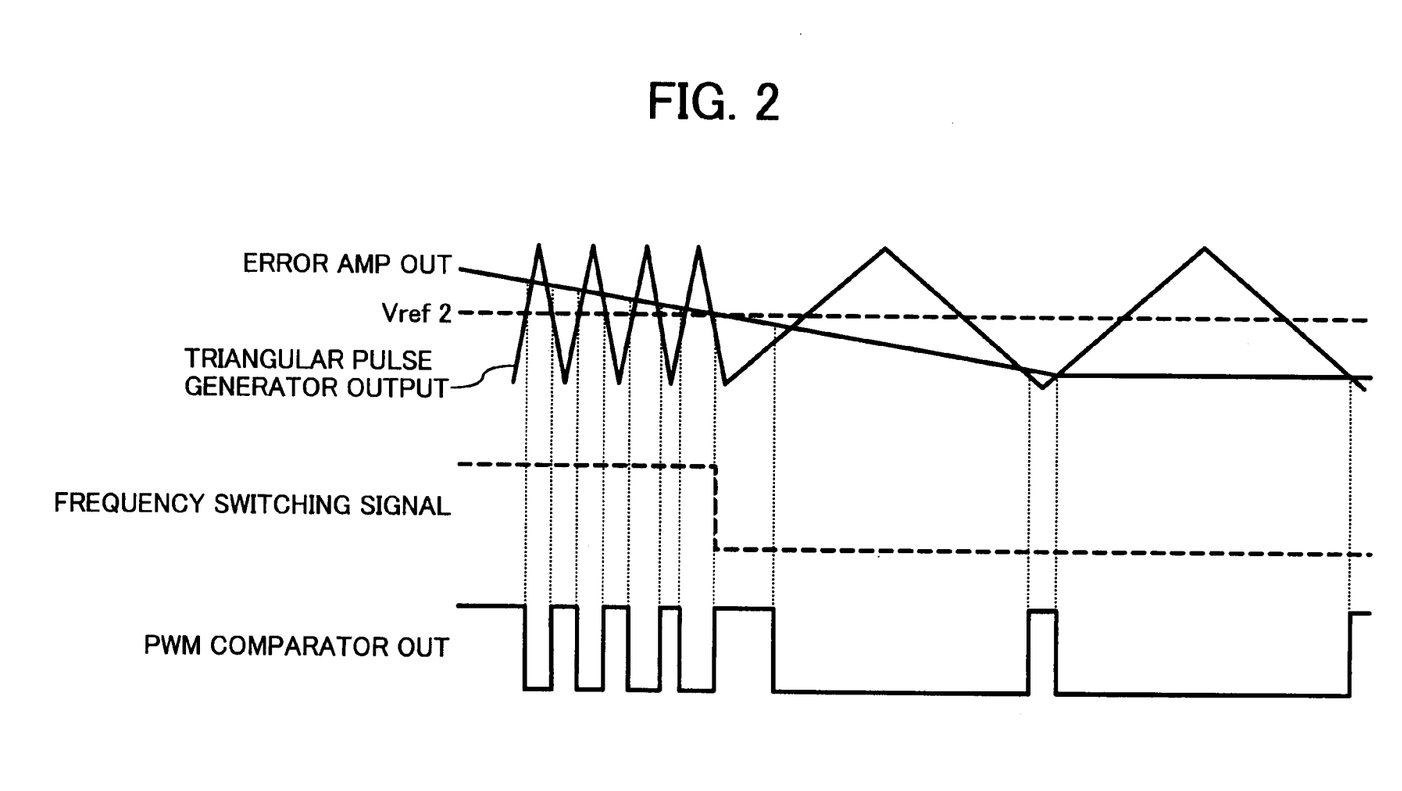
FIG. 2 illustrates waveforms showing the operation of the switching regulator.

FIG. 2 illustrates waveforms showing the operation of the switching regulator 100. The output voltage of the error-AMP 12, ERROR AMP OUTPUT, is being changed by comparing the output voltage of the error-AMP 12 with the triangular wave output from the triangular-pulse generator 10. As a result, the output pulse width of the PWM comparator 15 is controlled. An ON or OFF time of a switching transistor arranged next to the switching regulator 100 is controlled for a corresponding time to the output pulse width of the PWM comparator 15.

In some switching regulators which do not employ a current control mode, a feedback loop from the output of the switching regulator may include a time lag. The feedback speed may not be fast enough to control due to the time lag. The feedback voltage may move to higher or lower voltage than an expected voltage and may not be adjusted to a desired feed back voltage. As a result, the switching regulator may oscillate unintentionally.

Even if a switching regulator employs a current control mode and if a duty cycle of the switching regulator exceeds 50%, a slope compensation circuit may be required. The slop compensation circuit makes a slower rising edge of the output voltage of the switching regulator to avoid a destruction of transistor. However, using the slope compensation circuit, the switching regulator may be larger and complicated.

SUMMARY

This patent specification describes a novel switching regulator which includes a first amplifier configured to amplify a voltage difference between a voltage proportional to an output voltage of a switching regulator and a first reference voltage, a current detector configured to detect a current proportional to an output current of the switching regulator, a second amplifier configured to amplify an output signal from the current detector, a first converter configured to convert an output voltage of the first amplifier to a first current signal, a second converter configured to convert an output voltage of the second amplifier to a second current signal, an oscillator configured to oscillate with rectangular pulses and a controller configured to modulate an oscillation signal of the oscillator in accordance with the first and second current signals output from the first and second converters.

This patent specification further describes a novel switching regulator which further includes an inverter arranged in the controller and configured to input the oscillation signal of the oscillator and a current source connected to the inverter and configured to control a current of the inverter in accordance with the first and second output signals of converters.

Further, this patent specification describes a novel method of controlling a switching regulator which includes steps of amplifying a difference voltage between a voltage proportional to an output voltage of a switching regulator and a first reference voltage by a first amplifier, detecting a current proportional to an output current of the switching regulator, amplifying the detected current by a second amplifier, outputting the output signal amplified by the second amplifier to a controller, controlling an oscillator by a comparison result of an output signal of the first amplifier with a second reference voltage, inputting an oscillation signal of the oscillator and the output signal of the first and second amplifiers to a controller, comparing a controlled voltage of the oscillation signal based on the output signals from the first and second amplifiers with a third reference voltage and outputting a drive current to drive by controlling a duty cycle of the drive current based on the feedback voltage of the load voltage and a feedback current corresponding to the load current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring how to the drawings, wherein like reference numerals designate identical or corresponding parts throughout the several views, particularly to FIG. 3, a switching regulator according to exemplary embodiments are described.

Figure 3:
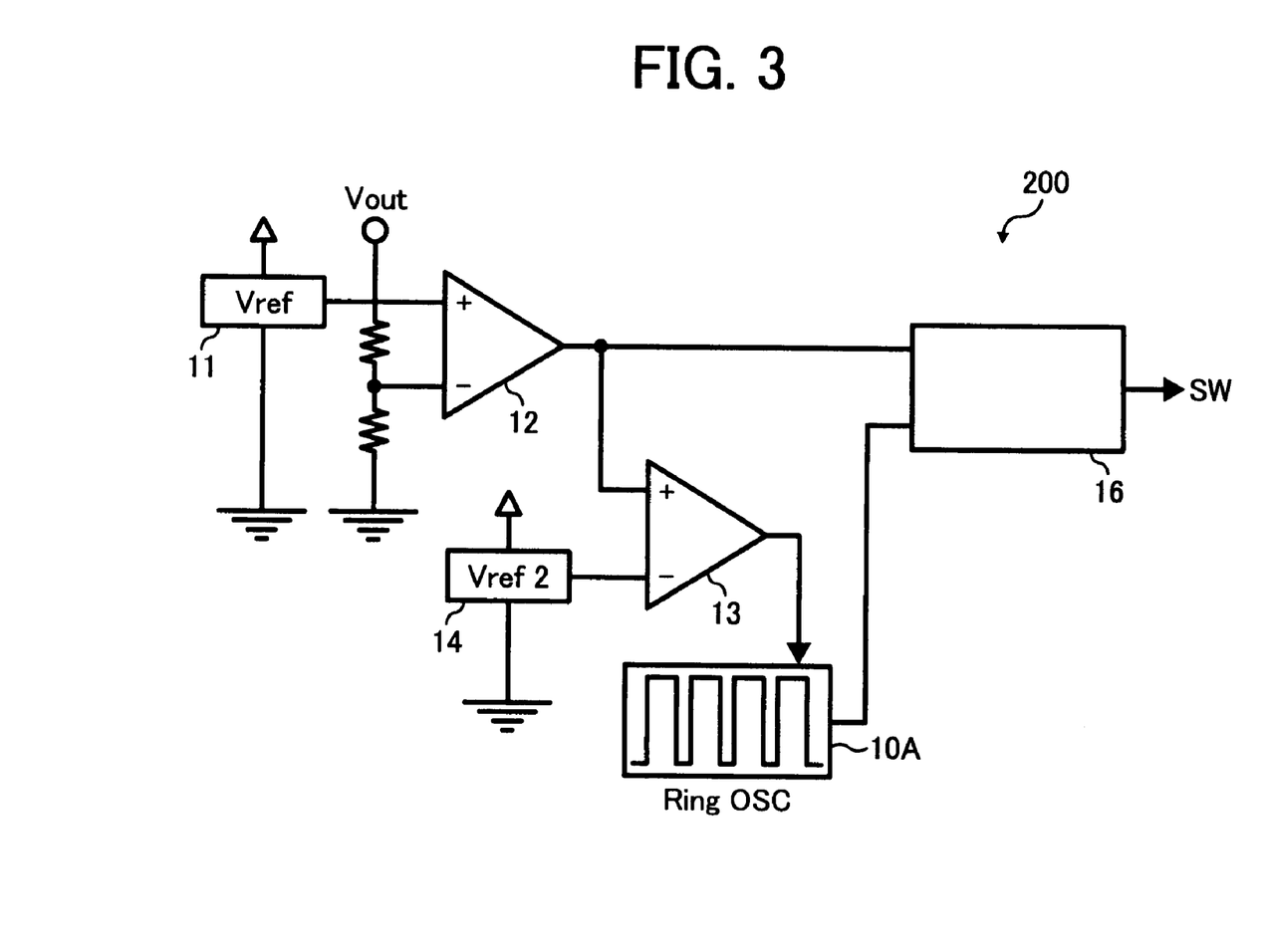
FIG. 3 illustrates an example of a basic configuration of a switching regulator circuit according to an exemplary embodiment of the present disclosure.
Figure 4:
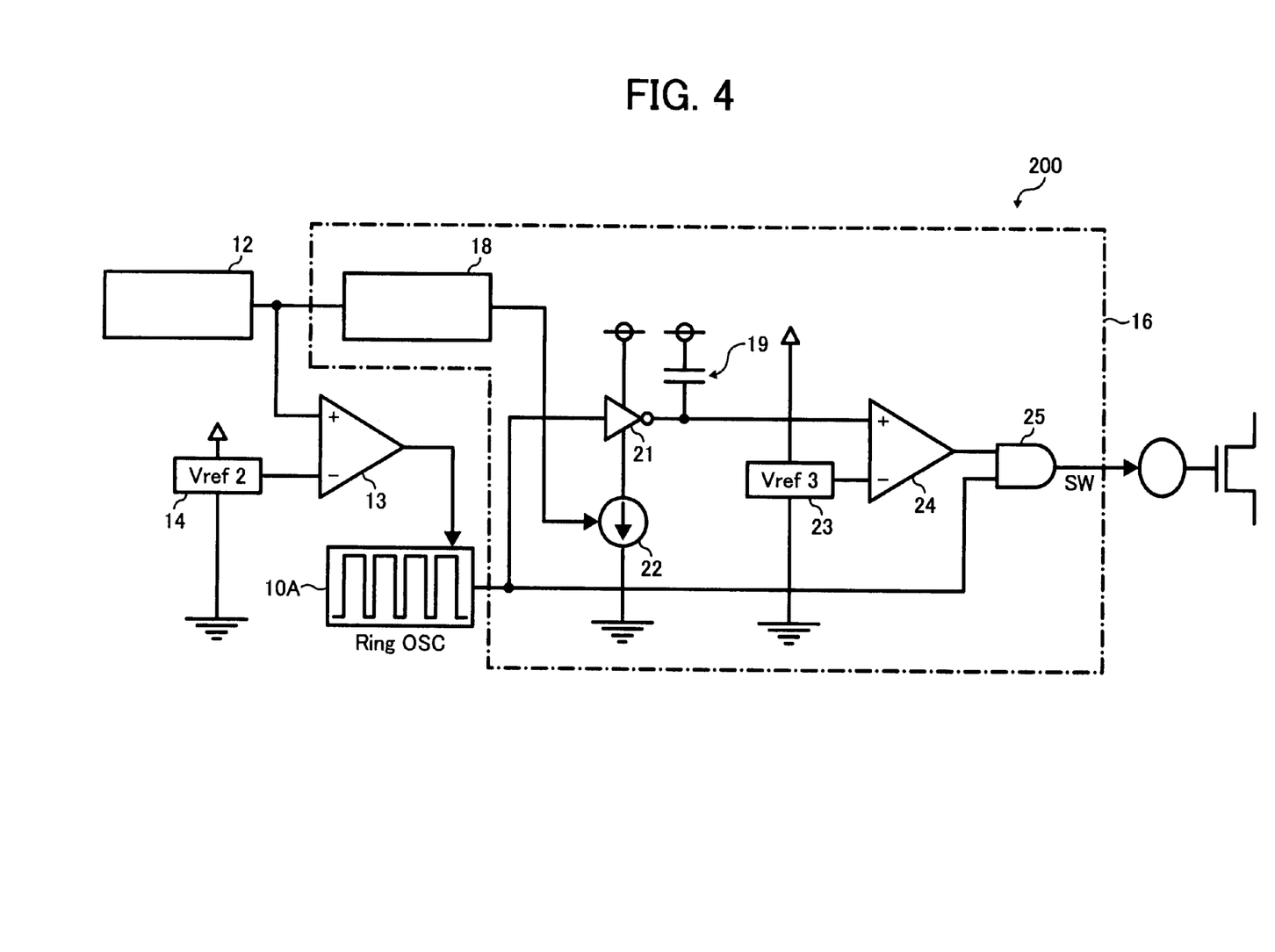
FIG. 4 illustrates circuit blocks of a PWM controller shown in FIG. 3, in more detail.

FIG. 3 illustrates an example of a basic configuration of a switching regulator circuit 200 according to an exemplary embodiment of the present disclosure. FIG. 4 illustrates circuit blocks of a PWM controller 16 shown in FIG. 3 in more detail.

The switching regulator circuit 200 includes two reference voltage circuits 11 and 14, bleeder resistances, an error-AMP 12, a comparator 13 similar to the conventional switching regulator. Further, the switching regulator circuit 200 includes a ring oscillator 10A and the PWM controller 16 instead of the triangular-pulse generator 10 and the PWM comparator 15. The ring oscillator 10A includes constant current inverters to oscillate with rectangular pulses. The PWM controller 16 includes a voltage-current converter circuit 18, an inverter 21, a capacitor 19, a current source 22, a third reference voltage (Vref3) circuit 23, a comparator 24 and an AND circuit 25 as shown in FIG. 4.

Similar to the conventional switching regulator, the error-AMP 12 inputs an output voltage Vout of the switching regulator and an output voltage of the bleeder resistances and outputs a difference voltage between these two voltages. The comparator 13 inputs the output signal of the error-AMP 12 and a second reference voltage Vref2 of the second reference voltage circuit 14 and judges whether the output signal of the error-AMP 12 is higher than the output voltage Vref2 of the second reference voltage circuit 14.

The output signal of the error-AMP 12 controls a current source 22 arranged in the PWM controller 16 via a voltage-current transfer circuit 18 as shown in FIG. 4. Further, the output signal of the error-AMP 12 controls an ON time of a switching transistor arranged outside the switching regulator circuit 200. The comparator 13 changes an oscillation frequency of the ring oscillator 10A based on a comparing result of the output signal of the error-AMP 12 with the reference voltage Vref2.

The output signal of the ring oscillator 10A is inverted by the inverter 21. The current of the inverter 21 is determined by the current source 22 which is controlled by the output signal of the error-AMP 12. A delay time is generated by the current of the inverter 21 and the capacitor 19 which is arranged between the output of the inverter 21 and a power terminal.

Figure 5:
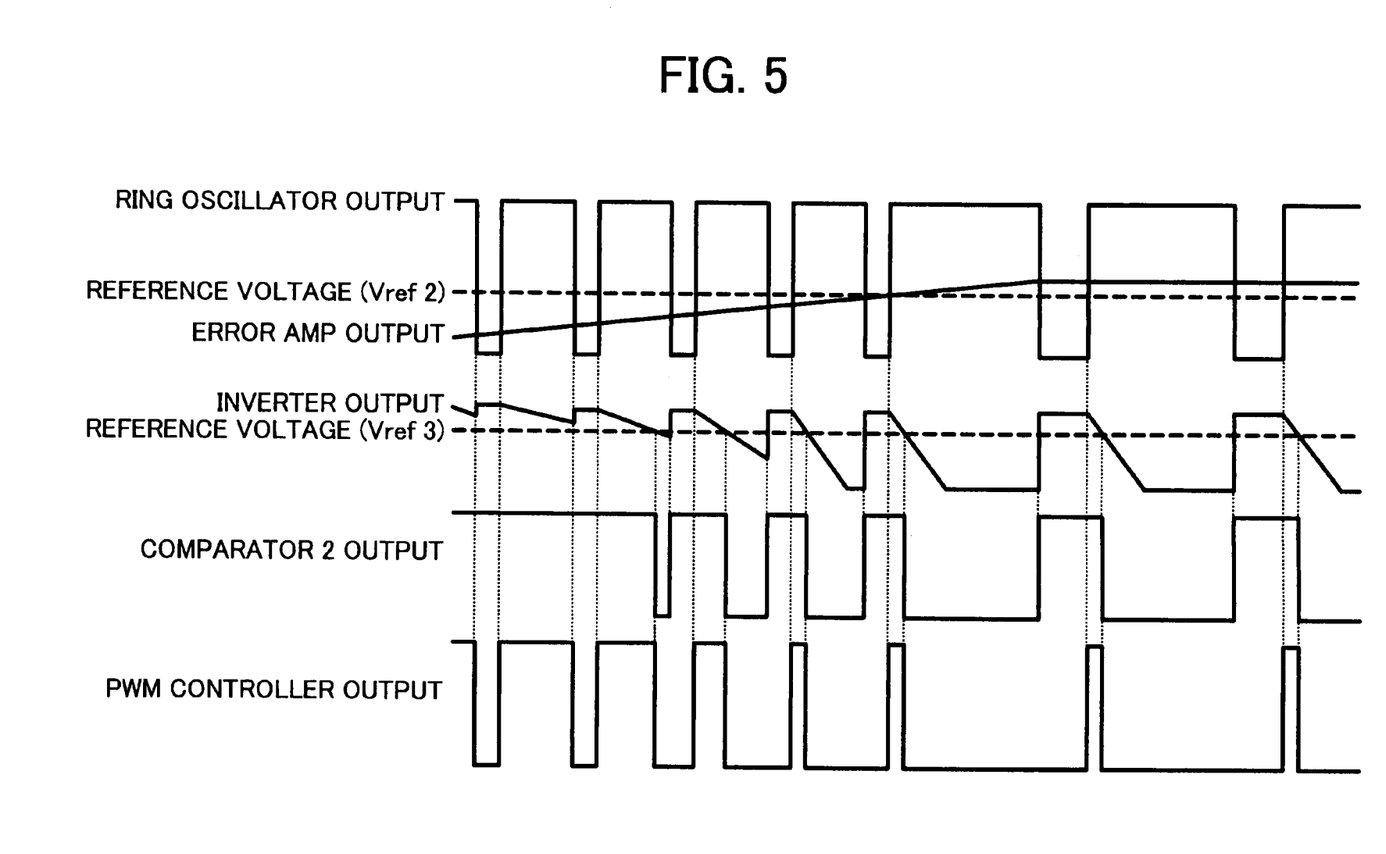
FIG. 5 illustrates operation waveforms of the switching regulator circuit shown in FIG. 3.

FIG. 5 illustrates operation waveforms of the switching regulator circuit 200 of FIG. 3. In FIG. 5, the output waveform of the ring oscillator 10A is illustrated. The output waveform of the ring oscillator 10A is changed from a narrower width pulse to a wider width pulse due to a change of a load. More specifically, the output signal of the error AMP 12, indicated by ERROR AMP OUTPUT, is increased from a low voltage to a high voltage with respect to the reference voltage Vref2 in FIG. 5 while the load is changed from heavier to lighter.

A waveform of the output signal of the inverter 21 is illustrated as INVERTER OUTPUT in FIG. 5 while the output voltage of the inverter 21 is high gradually. During a time period the output voltage of the error AMP 12 is lower than the reference voltage Vref2, the ring oscillator 10A generates a rectangular pulse with a constant cycle time. During a time period the output voltage of the error AMP 12 is higher than the reference voltage Vref2, the ring oscillator 10A outputs pulses with longer high time. The inverter 21 outputs pulses having longer cycle time in accordance with the output pulses of the ring oscillator 10A.

A waveform of the output voltage of the comparator 24, COMPARATOR 2 OUTPUT, is illustrated in FIG. 5, and is based on comparison of the output voltage of the inverter 21, INVERTER OUTPUT, to a reference voltage Vref3. The reference voltage, Vref3, is set to be lower value (approximately 0.5 v) than a supply voltage of the ring oscillator 10A and the inverter 21. The output signal of the PWM controller 16 is the output signal of the AND circuit 25 which performs AND calculation with the output of the comparator 24 and the output signal of the ring oscillator 10A.

Figure 6:
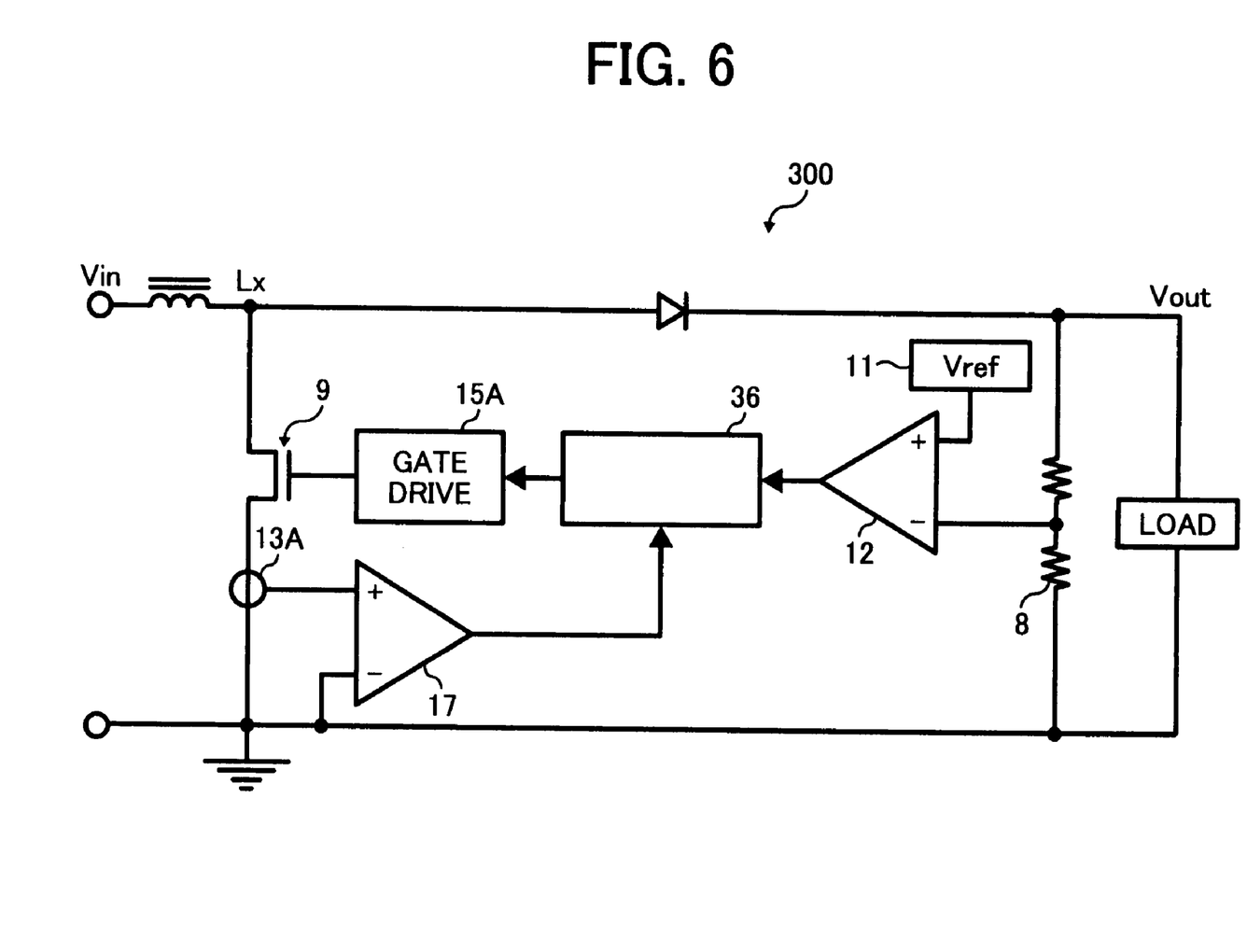
FIG. 6 illustrates a boost DC/DC converter which includes the switching regulator as an example of the application of the switching regulator.

FIG. 6 illustrates a boost DC/DC converter 300 which includes a switching regulator as an example of the application of the switching regulator. The boost DC/DC converter 300 includes a power input terminal Vin, a bleeder resistor 8, a switching transistor 9, a first reference voltage generator 11, a first error AMP 12, a current detection circuit 13A, a second error AMP 17, a PWM controller 36 and a gate drive circuit 15A.

The power input terminal Vin inputs a power supply. The bleeder resistor 8 is connected to a load LOAD in parallel. The first error AMP 12 amplifies a difference voltages between a divisional voltage from the bleeder resistor which is proportional to a load voltage, Vout, and a first reference voltage, Vref1. The current detection circuit 13A detects a current which flows through the switching transistor 9 and depends on a load current.

The second error AMP 17 amplifies an output signal of the current detection circuit 13A. The gate drive circuit 15A drives the switching transistor 9. The PWM controller 36 is a current-control type controller which converts a voltage to a current and modulates an oscillation signal from the oscillation circuit based on the converted current value. The load may be a compact equipment with a battery as a power source, in the exemplary embodiment.

The boost DC/DC converter 300 includes a first and second feedback circuits. The first feedback circuit is formed by the first error AMP 12 and the PWM controller 36 and the second feedback circuit is formed by the switching transistor 9 and the PWM controller 36.

To detect a change of the load voltage, Vout, it is more effective to directly detect the current flow of the switching transistor 9 which is reflected to the load current. Namely, the change of the load can be detected more quickly and in more precise by a detection of an output signal of the second error AMP 17 in comparison with a detection of an output signal of the first error AMP 12.

The boost DC/DC converter 300 can instantly detect the voltage change of the load by employing this double feedback control. Namely, it is possible to accelerate a rising speed of the load voltage quickly when the load voltage is decreasing and to slow a falling speed of the load voltage when the load voltage is increasing. It is difficult to control to make the load voltage falling in a short time only by the first error AMP 12 due to time lag.

The feedback voltage goes higher or lower than a predetermined voltage because of a control timing shift. If an unstable condition has been continued for a certain period, the boost DC/DC converter 300 may begin to oscillate due to this over swing.

In the switching regulator according to an exemplary embodiment, the current of the switching transistor 9 which is controlled by the gate drive circuit 15A is being sensed. The sensed signal is amplified by the second error AMP 17. The PWM controller 36 controls the duty of the control signal for the gate drive circuit 15A. As a result, it is possible to avoid the oscillation due to the change of the load condition by this feedback.

Figure 7:
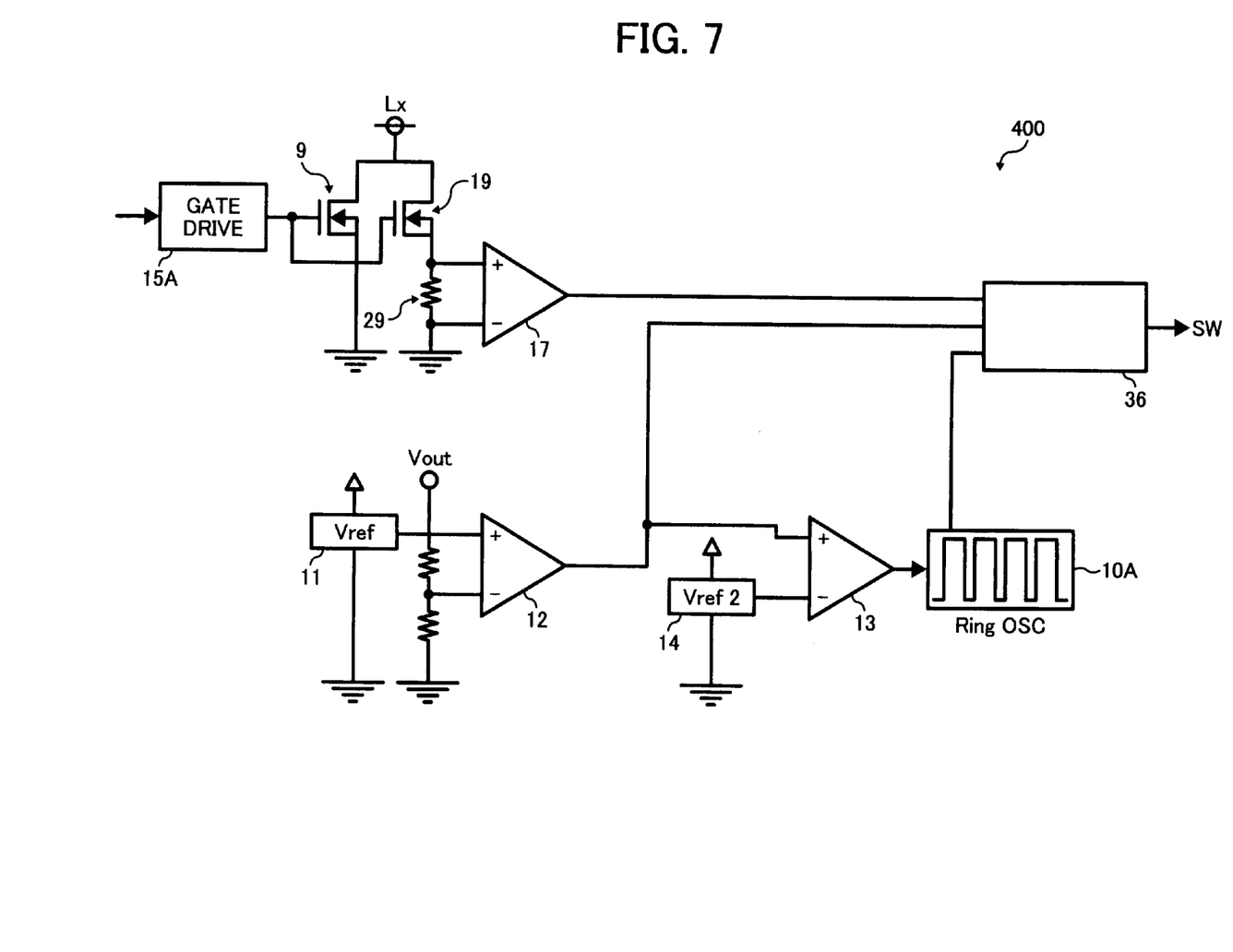
FIG. 7 illustrates a switching regulator according to another exemplary embodiment.

FIG. 7 illustrates a switching regulator 400 according to another exemplary embodiment. The switching regulator 400 includes a gate drive circuit 15A, a NMOS driver transistor 9, a mirror transistor 19, a resistor 29, a second error AMP 17, a PWM controller 36, a first reference voltage source 11, a first error AMP 12, a second reference voltage source 14, a comparator 13 and a ring oscillator (OSC) 10A.

In FIG. 7, the output signal of the PWM controller 36 is input to the gate drive circuit 15A. The NMOS driver transistor 9 is driven by the gate drive circuit 15A and the mirror transistor 19 is connected in parallel to the NMOS driver transistor 9. The comparator 13 compares an output signal of the first error AMP 12 and the second reference voltage Vref2 of the second reference voltage circuit 14.

A current of the NMOS driver transistor 9 is detected by the mirror transistor 19 and the resistor 29 connected to a source of the mirror transistor 19 as a voltage of the resistor 29. The detected current is amplified by the second error AMP 17 and is output to the PWM controller 36. Thus, the current detection circuit is formed of the mirror transistor 19 and the resistor 29.

The first error AMP 12 amplifies the difference voltage between the load voltage Vout and the first reference voltage circuit 11. The comparator 13 compares the output voltage of the error AMP 12 with the reference voltage of the second reference voltage circuit 14 and outputs a control signal to control the ring OSC 10A.

Figure 8:
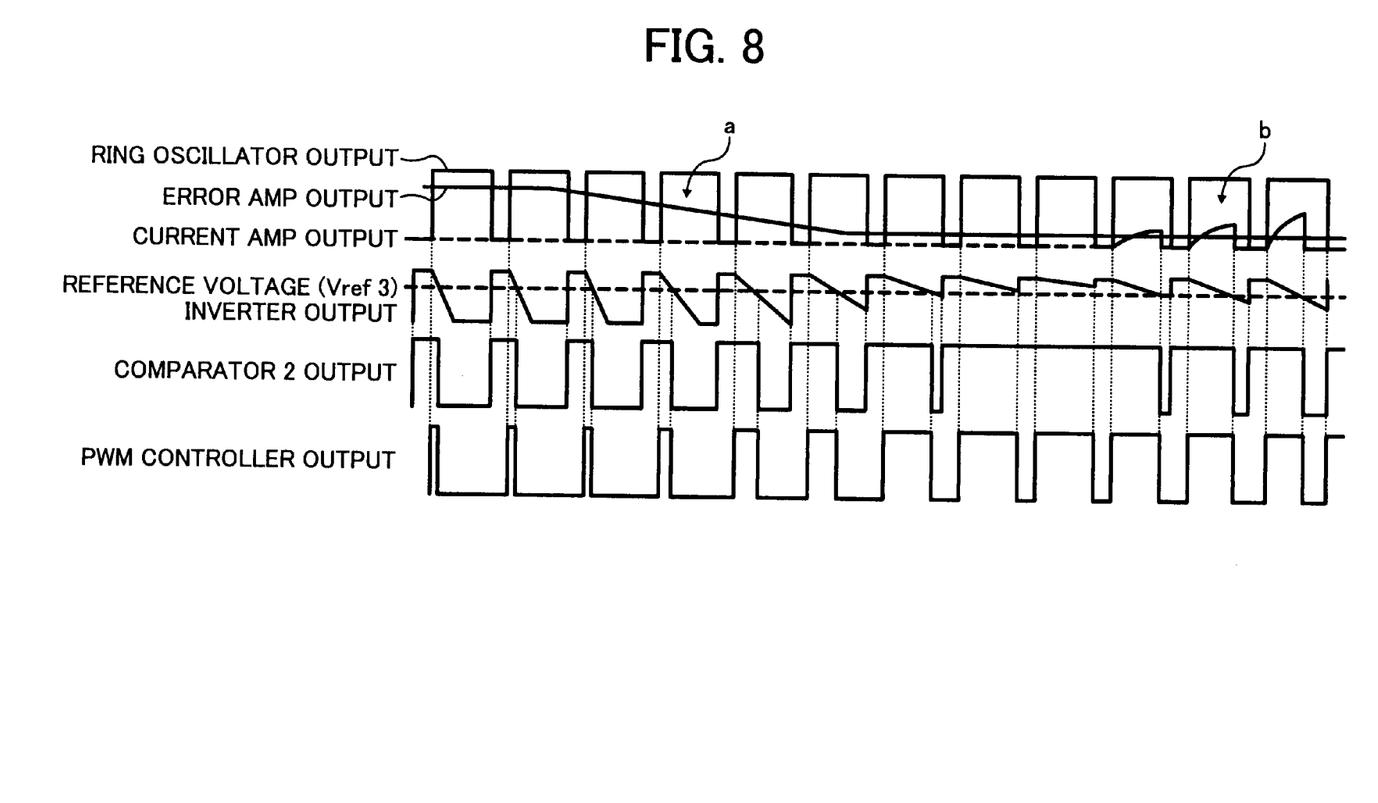
FIG. 8 illustrates waveforms at each terminal of the PWM controller shown in FIG. 7.
Figure 9:
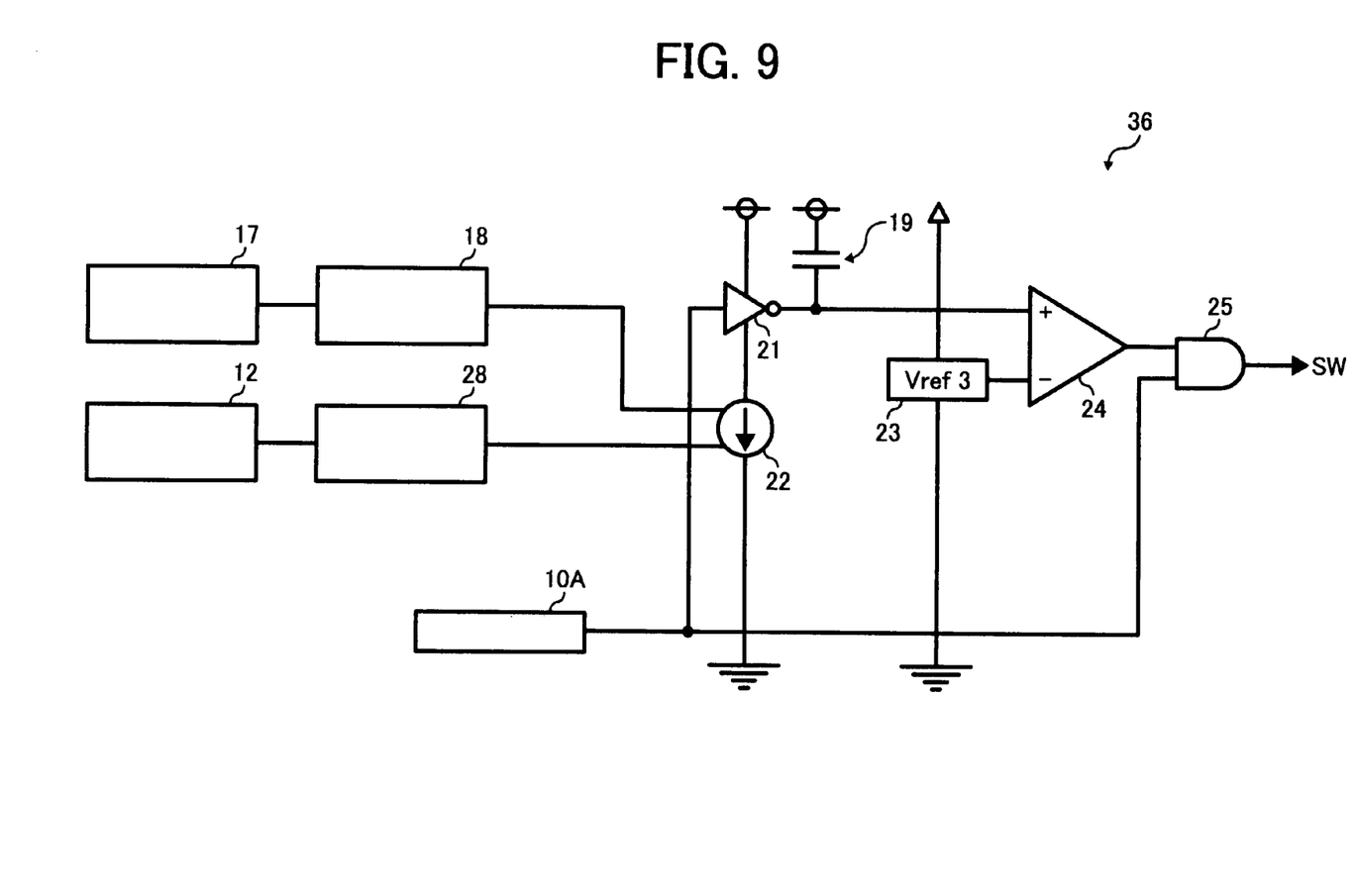
FIG. 9 illustrates a detailed block diagram of the PWM controller shown in FIG. 8.

FIG. 8 illustrates waveforms at each terminal of the PWM controller 36. FIG. 9 illustrates a detailed block diagram of the PWM controller 36 of FIG. 8. When the load capacity is increased, the current of the NMOS driver transistor 9 in FIG. 7 is increased. The resistor 29 generates a voltage corresponding to the increase of the current of the NMOS driver transistor 9. The second error AMP 17 detects the voltage of the resistor 29 as a voltage signal. The second error AMP 17 amplifies the voltage signal of the resistor 29.

Referring to FIG. 9, the output signal from the second error AMP 17 is input to a current source 22 through a voltage-to-current converter 18. As described in FIG. 7, the first error AMP 12 amplifies the difference voltage between the load voltage Vout and the first reference voltage of the first reference circuit 11. The output signal from the first error AMP 12 is also input to the current source 22 through a voltage-to-current converter 28 as shown in FIG. 9. The current source 22 controls a current of the inverter 21.

Furthermore, the oscillation signal is controlled by adjusting the current of the inverter 21 and by comparing the output of the inverter 21 with a third reference voltage Vref3 of a third reference voltage circuit 23. As a result, a duty of the switching operation of the switching regulator 400 is controlled.

The waveforms of the exemplary embodiment will be discussed referring to FIG. 8 comparing to the waveforms of the conventional basic circuit shown in FIG. 5. In the waveforms of the basic circuit FIG. 5, the current source 22 of the PWM controller 16 outputs a current signal corresponding to pulses of the ring oscillator 10A when the output voltage of the error AMP 12 is low and the output voltage of the inverter 21, INVERTER OUTPUT, is higher than the third reference voltage Vref3.

The current source 22 of the PWM controller 16 outputs a narrower pulse than the pulse width of the ring oscillator 10A while the output voltage of the error AMP 12 is higher. Similar control is performed in the exemplary embodiment of FIG. 8, but, the PWM controller 36 is also controlled by the output signal of the second error AMP 17.

FIG. 5 illustrates that the output signal of the error AMP 12 is changing from a lower voltage to a higher voltage. However, FIG. 8 illustrates that the output signal of the error AMP 12 is changing from a higher voltage to a lower voltage.

In FIG. 5, two output signals i.e., the output signal of the ring oscillator 10A (RING OSCILLTOR OUTPUT) and the output signal of the first error AMP 12 (ERROR AMP OUTPUT) are referred. However, in FIG. 8, three voltages i.e., the output signal of the ring oscillator 10A (RING OSCILLTOR OUTPUT) and the output signals of the first and second error AMPs 12 and 17, (ERROR AMP OUTPUT, CURRENT AMP OUTPUT) are referred. Thus, the output signal of the switching regulator 400 is controlled by the effect of the second error AMP 17 additionally.

When the load capacity is being increased, the current of the NMOS driver transistor is increased in accordance with the increase of the load current and the output signal of second error AMP 17 is becoming higher. The output signal of the first error AMP 12 is shifting from a higher voltage to a lower voltage as shown by a notation "a" in FIG. 8.

Further, the output signal of the second error AMP 17 is increased at each pulse as shown by a notation "b" in FIG. 8. At a time period shown by the notation "b", the output pulse width of the PWM controller 36 is made narrower gradually and the duty cycle is becoming smaller. A part of the output signal of the inverter 21 at corresponding portion shown by "b" in FIG. 8 is lower than the output voltage of the reference voltage circuit 23 as referred to the waveforms INVERTER OUTPUT and REFERENCE VOLTAGE (Vref3). For the time period, the pulse width of the high level of the PWM controller 36 is shorten.

When the load capacity becomes lighter, the current of the NMOS driver transistor becomes smaller and the output signal of the second error AMP 17 becomes lower. In this condition, the output pulse width of the PWM controller 36 is depended on the output signal of the first error AMP 12.

As described, the current source 22 outputs the current signal corresponding to pulses of the ring oscillator 10A when the output voltage of the first error AMP 12 is low and the output voltage of the inverter 21 is higher than the third reference voltage Vref3. The current source 22 outputs a narrower pulse than the pulse width of the ring oscillator 10A when the output voltage of first error AMP 12 is higher. Meanwhile, when the load capacity becomes lighter, the output voltage of the second error AMP 17 begins to fall. The output pulse width of the PWM controller 36 is made wider at each pulse of the ring oscillator 10A. Thus the output pulse width of the PWM controller 36 is controlled.

In the exemplary embodiment of the switching regulator, the current of the switching transistor is detected and the detected current is amplified by the second error AMP 17. The output signal of the second error AMP 17 is input to the PWM controller 36. In parallel, the difference voltage between the load voltage and the first reference voltage is amplified by the first error AMP 12. The comparator 13 compares the output voltage of the first error AMP 12 and the second reference voltage and outputs a control signal to control the ring oscillator 10A.

The PWM controller 36 inputs the output voltage of the first and second error AMPs 12 and 17 and the output signal of the ring oscillator 10A. The duty cycle of the switching regulator is controlled by the signal of the ring oscillator 10A based on the feedback voltage of the load voltage and the feedback current in accordance with the load current.

The comparator 24 compares the controlled output signal of the ring oscillator 10A with the reference voltage (Vref3). The AND gate 25 outputs a control signal to drive the switching transistor based on the output signal of the comparator 24 and the output signal of the ring oscillator 10A.

The switching regulator of the present disclosure can be used in any of a number of manners. For example, as should be apparent from this disclosure, the switching regulator of this disclosure can be employed in portable electronic devices which use a battery as a power source.

Numerous additional modifications and variations are possible in light of the above teachings. It is therefore to be understood that within the scope of the appended claims, the disclosure of this patent specification may be practiced otherwise than as specifically described herein. For example, elements and/or features of different examples and illustrative embodiments may be combined with each other and/or substituted for each other within the scope of this disclosure and appended claims.

This patent specification is based on Japanese patent application, No. 2005-281758 filed on Sep. 28, 2005 in the Japan Patent Office, the entire contents of which are incorporated by reference herein.

What is claimed is:

1. A switching regulator, comprising:
    a first amplifier configured to amplify a voltage difference between a voltage proportional to an output voltage of the switching regulator and a first reference voltage;
    a current detector configured to output an output signal proportional to an output current of the switching regulator;
    a second amplifier configured to amplify the output signal from the current detector;
    a first converter configured to convert an output voltage of the first amplifier to a first current signal;
    a second converter configured to convert an output voltage of the second amplifier to a second current signal;
    an oscillator configured to oscillate with rectangular pulses; and
    a controller configured to modulate an oscillation signal of the oscillator in accordance with the first and second current signals output from the first and second converters.

2. The switching regulator of claim 1, further comprising:
    an inverter arranged in the controller and configured to input the oscillation signal of the oscillator; and
    a current source connected to the inverter and configured to control a current of the inverter in accordance with the first and second current signals of said first and second converters, respectively.

3. The switching regulator of claim 2,
    wherein the current source outputs a current signal corresponding to pulses of the oscillator when the first amplifier outputs a low voltage and the output voltage of the inverter is higher than predetermined voltage and outputs narrower pulses than the pulse of the oscillator when the first amplifier outputs a high voltage which is higher than the low voltage, and wherein the second amplifier outputs the voltage increasing to the high voltage and the controller outputs narrower pulses at each pulse in accordance with the increase of the output voltage of the second amplifier when the load capacity which flows larger load current is larger.

4. The switching regulator of claim 3,
    wherein the second amplifier outputs the voltage decreasing to the low voltage and the controller outputs wider pulses at each pulse in accordance with the drop of the output voltage of the second amplifier when the load capacity is smaller.

5. The switching regulator of claim 1, wherein the current detector includes a MOS driver transistor, a mirror transistor and a resistor connected to a source of the mirror transistor.

6. A portable electronic device employing the switching regulator of claim 1.

7. A portable electronic device including a switching regulator and a battery as a power source, said switching regulator comprising:
    a first amplifier configured to amplify a voltage difference between a voltage proportional to an output voltage of the switching regulator and a first reference voltage;
    a current detector configured to output an output signal proportional to an output current of the switching regulator;
    a second amplifier configured to amplify the output signal from the current detector;
    a first converter configured to convert an output voltage of the first amplifier to a first current signal;
    a second converter configured to convert an output voltage of the second amplifier to a second current signal;
    an oscillator configured to oscillate with rectangular pulses; and
    a controller configured to modulate an oscillation signal of the oscillator in accordance with the first and second current signals output from the first and second converters.

8. A method of controlling a switching regulator, the method comprising the steps of:
    amplifying a difference voltage between a voltage proportional to an output voltage of the switching regulator and a first reference voltage by a first amplifier;
    outputting an output signal proportional to an output current of the switching regulator;
    amplifying the output signal by a second amplifier;

outputting the output signal amplified by the second amplifier to a controller;

controlling an oscillator by a comparison result of an output signal of the first amplifier with a second reference voltage;

inputting an oscillation signal of the oscillator and the output signal of the first and second amplifiers to a controller;

comparing a controlled voltage of the oscillation signal based on the output signals from the first and second amplifiers with a third reference voltage; and outputting a drive current to drive by controlling a duty cycle of the drive current based on the feedback voltage of the load voltage and a feedback current corresponding to the load current.

* * * * *